Aug. 2, 1960 E. ESTREMS ET AL 2,947,865

IMPULSE DISTRIBUTOR

Filed March 1, 1957 6 Sheets-Sheet 1

INVENTORS
EUGENI ESTREMS
MAURICE PAPO
BY
James A. Smith
AGENT

Aug. 2, 1960 E. ESTREMS ET AL 2,947,865

IMPULSE DISTRIBUTOR

Filed March 1, 1957 6 Sheets-Sheet 2

Aug. 2, 1960 E. ESTREMS ET AL 2,947,865

IMPULSE DISTRIBUTOR

Filed March 1, 1957 6 Sheets-Sheet 4

United States Patent Office 2,947,865

Patented Aug. 2, 1960

2,947,865

IMPULSE DISTRIBUTOR

Eugeni Estremis, Saint Mande, and Maurice Papo, Paris, France, assignors to International Business Machines Corporation, New York, N.Y., a corporation of New York Filed Mar. 1, 1957, Ser. No. 643,369

Claims priority, application France Mar. 20, 1956

4 Claims. (Cl. 250—27)

Figure 1A:
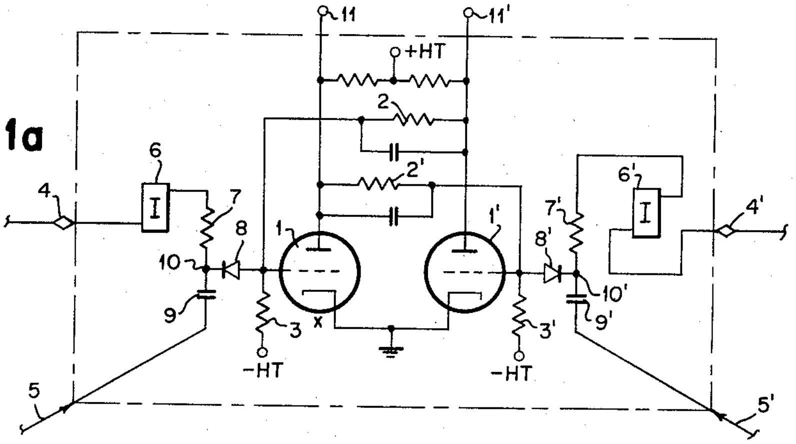

This invention relates generally to impulse distributors and is particularly directed to a pulse distribution chain adapted to cooperate with a magnetic memory device for controlling the sequence of impulses directed to reading in or reading out of data therefrom.

The essential component of any digital computer comprising electronic means is a pulse source and means operable by the pulse source for generating the multitude of timing impulses used by the computer. It has been a practice of computer designers to use binary coupled chains of dual stability triggers for the generation of timing impulses.

The principal object of the present invention resides in the provision of means wherein a plurality of chains of dual stability triggers are used in combination for the generation of impulses.

Another object of the invention resides in the provision of common control means for a plurality of pulse distribution chains.

Yet another object of the invention resides in the provision of means for generating a pair of synchronization impulses of different phases such that when one or the other of these impulses coincides in time with a control impulse one or the other of the plurality of pulse distribution chains is operated.

A further object of the invention resides in the provision of a pulse distribution chain for changing the operating status of individual triggers in selected portions in the plurality of pulse distribution chains.

Yet another object of the invention resides in the provision of means enabling one of the chains to be stopped and a selected trigger in the stopped chain to be automatically controlled for each instance of trigger operation in another chain.

Still another object of the invention resides in the provision of a pulse generating device comprising two chains of triggers having common control elements and wherein the control elements are so arranged that a single input terminal receives controlling impulses for operating triggers of the same order in each chain.

An impulse distributor, according to the present invention, is advantageous for the production of control and operating impulses for the transfer of data between a pair of memories, for example, memories such as those comprising a plurality of magnetic core elements. When data in different positions *p*1 to *p*2 of a memory *m*1 are to be transferred from that memory into a preselected position or zone comprising positions *p*3 to *p*4 of a second memory *m*2, it is convenient to control two separate impulse distributing chains, one of which operates to scan positions *p*1 to *p*2 in memory *m*1, and the other of which scans positions *p*3 through *p*4 in memory *m*2.

In accordance with the present invention, two chains, each comprising a plurality of dual stability triggers, are so designed that in each chain a single trigger in each chain is in an operating state while all the others of both chains are in a non-operated state. Upon reception of a suitably timed pulse, a single trigger of a chain is operated on the ON state, while the trigger which was in the ON state is turned OFF. Such chains of triggers are well-known in the art, and reference may be had to U.S. Patent No. 2,534,232 to Claud E. Cleeton, issued December 19, 1950, for "Trigger Circuit and Switching Device." In the two chain combination disclosed in this invention each chain will advance by one state in turn, according to the reception of control impulses applied to a common input.

Another object of the invention resides in the provision of means enabling one of said plural trigger chains to produce predetermined skips in the operation of another chain of triggers.

Yet another object of the invention resides in the provision of means comprising another chain of triggers coacting with one of said plurality of trigger chains through a series of coincidence mixing circuits for varying the operation of each of said plurality of trigger chains selectively according to predetermined programs.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1*a* illustrates the circuit diagram of a dual stability trigger such as may be used in the present invention.

Figure 1B:
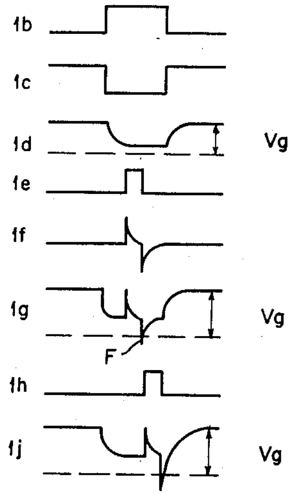

Figs. 1*b* shows, to a commontime base, impulse wave forms used in the operation of the trigger shown in Fig. 1*a*.

Figure 2B:
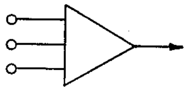
Figure 2A:
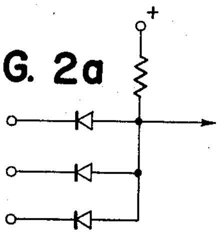

Fig. 2*a* is a circuit diagram of a logical AND circuit.

Fig. 2*b* is a block diagram of the circuit shown in Fig. 2*a*.

Figure 3B:
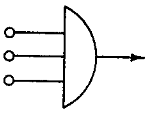
Figure 3A:
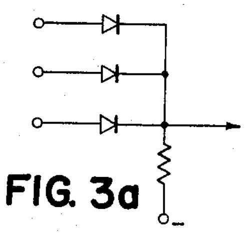

Fig. 3*a* is a circuit diagram of a logical OR circuit.

Fig. 3*b* is a block diagram equivalent to the circuit shown in Fig. 3*a*.

Figure 4:
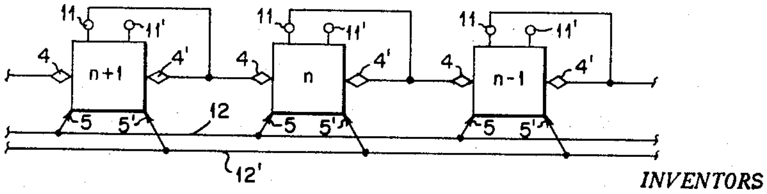

Fig. 4 is a block diagram showing the interconnections for a chain of triggers.

Figure 5A:
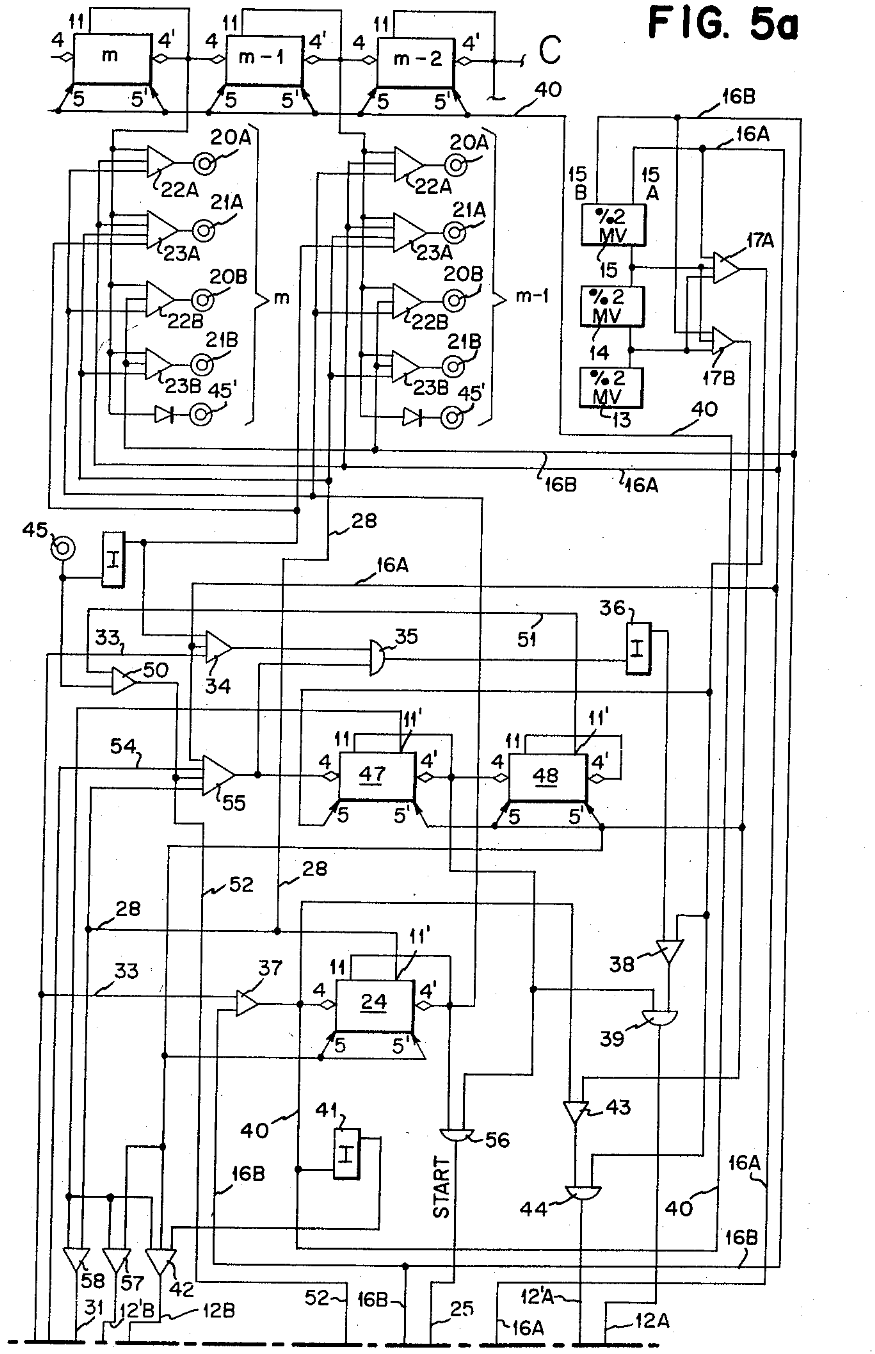
Figure 5B:
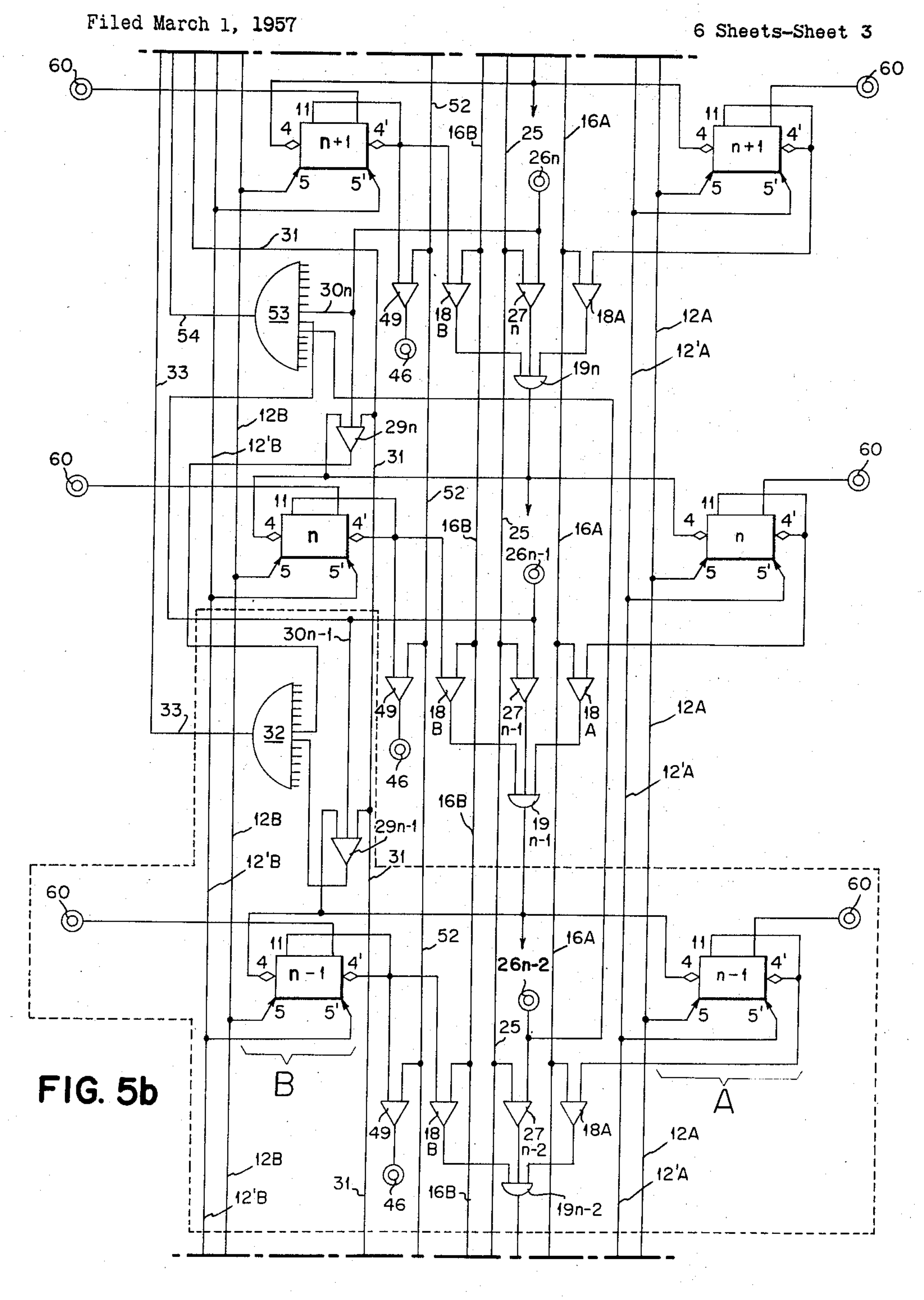
Figure 5C:
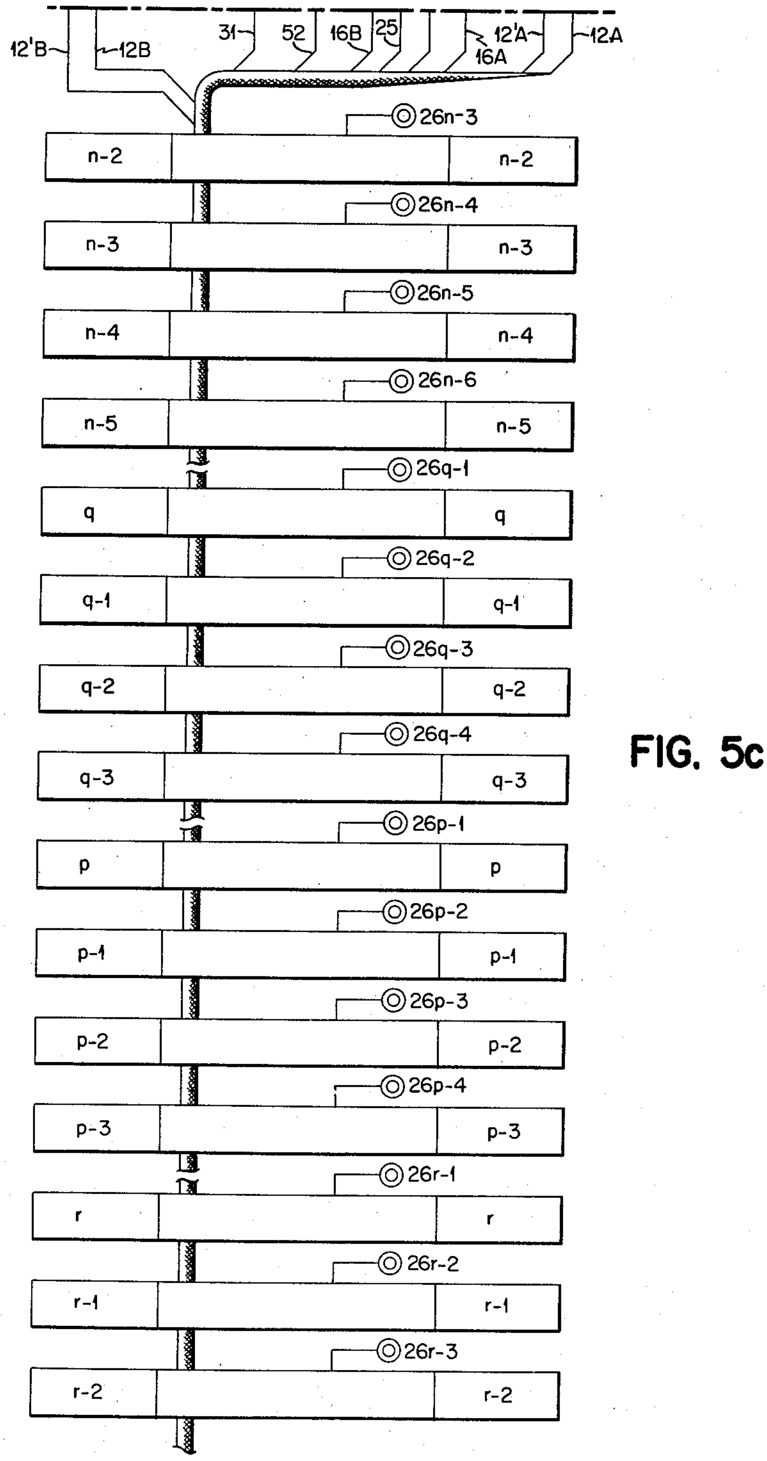

Figs. 5*a* through 5*c* are circuit diagrams partially in block form of plural trigger chains and program control means embodying the present invention.

Figs. 6, 7 8 and 9 show the timing of the pulse trains produced by the circuits of Figs. 5*a* and 5*b*.

The circuits of Figs. 5*a* and 5*b* comprise a number of dual stability triggers and OR and AND circuits. A trigger, such as may be used in the invention, is shown in Fig. 1*a*. It will be apparent that other types may be used, such as transistorized triggers. In particular, the transistorized trigger, such as is disclosed in U.S. Patent Application Serial No. 459,381, filed on September 30, 1954 by Robert A. Henle et al. now Patent No. 2,861,200 is especially suitable. The trigger of Fig. 1*a* comprises a pair of triodes 1 and 1', both cathodes of which are grounded and where the anodes are connected through a resistor to a source of high potential +HT. The control grids of each triode are cross-connected to the anode of the other triode through networks 2 and 2', each comprising a capacitor paralleled by a resistor. The input circuits connected to each control grid are identical—one will be described.

The control grids are biased with a fixed voltage provided by resistors 2 and 3 series-connected across the source of high potential HT. The control grid is connected to the junction of these resistors. The bias voltage at the grid is labeled Vg. Each input circuit has two terminals respectively labeled 4 and 5. Terminal 4 is connected to the control grid through an inverter 6 which is shown diagrammatically in series with a resistor 7 and a diode 8. Input terminal 5 is connected to the control grid through a capacitor 9 and the said diode 8.

The operation of the trigger will now be described and reference should be made to Fig. 1*b*, waveforms 1*b* through 1*j*. Terminals 4 and 4' of a trigger are those to which relatively long time duration pulses may be applied. Any terminal receiving long time duration pulses is shown on the drawings by a diamond. Terminals 5 and 5' are those to which pulses of a relatively short time duration may be applied. Any terminal receiving short time duration pulses is shown on the drawings by an arrowhead.

It will be assumed that tube 1 is in a conductive state as indicated by the X placed below the cathode, and tube 1' is not conductive. Assume for the moment that a positive pulse, such as is shown in Fig. 1*b* waveform 1*b*, is applied to terminal 4. At the output of the inverter, this pulse is 180 degrees out of phase with the input or is a negative going impulse as shown by waveform 1*c*, and after passing through the resistor 7 and diode 8 will have the shape shown in waveform 1*d*. This impulse will have no effect on the state of conduction of tube 1, inasmuch as the bias voltage V*g* exceeds the negative going amplitude of this pulse.

Now, if during the time that pulse 1*c* is applied to the grid, a second pulse of shorter time duration, as is represented in waveform 1*e*, is applied to terminal 5, the two pulses will be additive at point 10. This second pulse on passing through capacitor 9 will be differentiated as shown in waveform 1*f* so that each front thereof produces a separate impulse. These additive pulses appear at the junction of resistor 7 and capacitor 9 at the input to diode 8, and the trailing edge F, which coincides in time with the trailing edge of pulse waveform 1*e*, extends below the bias voltage V*g*.

It will also be appreciated that this combined signal is clipped at the level V*g* so that only the negative peak F is applied to the grid of triode 1. It was asumed that triode 1 was conducting and hence the application of two pulses of proper shape to two terminals 4 and 5 will have the effect of driving the control grid of tube 1 below the cutoff point thereby interrupting conduction. When current ceases to pass through the tube 1, voltage on the anode thereof will rise. The positive impulse thus produced will appear at the control grid of tube 1' by virtue of the cross-connection 2, 2'. This positive impulse will operate to initiate conduction in tube 1' thereby flipping the trigger from one stable state to its other stable state.

*"AND" circuits*

An AND or coincidence pulse mixing circuit is shown in Fig. 2*a*, and the block diagram corresponding thereto is shown in Fig. 2*b*. An AND circuit comprises a number of diodes (three in the case of the figure), each of which has a separate input and whose outputs are commoned. The diodes are placed in the circuit such that they will conduct current in the output-input sense when the common output terminal is connected (through a resistor) to a voltage source more positive than the normal potential of the input terminals. The potential of the common output is, therefore, substantially equal to that of an input having a lower potential. If all the inputs normally have the same lower potential applied, a positive pulse applied simultaneously to all inputs will be transmitted to the output.

*"OR" circuits*

An OR circuit is shown in Fig. 3*a*, and its corresponding symbolic block diagram is shown in Fig. 3*b*. An OR circuit comprises a number of diodes (three in the case of the figure) and a resistor. Each diode is connected to a separate input terminal and to a commoned output terminal. The resistor is connected between the output terminal and a source of negative potential. The diodes are placed in the circuit such that they will conduct current in the input-output sense when the potential of the voltage source is more negative than the normal potential applied to the input terminals. The potential of the common outputs is, therefore, substantially equal to that of an input having a higher potential. If any one of the input terminals is raised in potential the potential at the output terminal will also rise, since an increased current will be caused to flow through the resistor. The diode corresponding to the input terminals having normal potential, will not pass current because the potentials on their terminals will be in the high-impedance direction for these diodes. Hence, the output terminal will be relatively more positive than normal if one input terminal or either of the others is made more positive than normal.

Triggers of the type shown in Fig. 1*a* may be interconnected to form a binary chain of triggers, such as is shown in Fig. 4. Each of the triggers $n$, $n+1$, $n-1$ comprises the circuit shown inside the dotted outline of Fig. 1*a*. The inputs 4, 5, 4', 5', 11 and 11' correspond to like numbered treminals in Fig. 1*a*. The diamonds applied to terminals 4 and 4' indicate that slow pulses will be applied to these terminals. The presence of these pulses will not permit switching of the trigger, but will condition the same for later switching by a suitable pulse applied to terminals 5 or 5'. In Fig. 4 each trigger is connected to the succeeding trigger by means of a wire from terminal 11 of one trigger to terminal 4 of the succeeding trigger. Terminal 4' of the first trigger and terminal 4 of the succeeding trigger are likewise connected. This connection operates to supply conditioning impulses to the adjacent triggers. A pair of pulse lines 12 and 12' are provided to supply pulses simultaneously to all of the triggers in the chain. Terminals 5 of each trigger are connected to pulse line 12, and terminals 5' of each trigger are connected to pulse line 12'. Line 12 is connected to a source of operating impulses, while line 12' is connected to a source of reset impulses. The operation of the chain is as follows:

Assume for the moment that trigger stage $n+1$ is in the operated state, i.e. the right hand tube thereof is conducting. In this condition, terminal 11 is at a high potential since triode 1 is non-conducting. This potential is applied to a terminal 4' of trigger $n+1$ as well as to terminal 4 of trigger $n$ conditioning both triggers for operation. If operating impulses are applied to terminals 5 of all the triggers, only that trigger which has been conditioned will be operated to its other stable state. In this case trigger $n$ will be operated. Similarly, if a reset pulse is applied through line 12', trigger $n+1$ will be operated to its other stable state. Pulses may be applied simultaneously or differentially to lines 12 and 12'.

In Figs. 5*a* and 5*b* two chains of triggers, each similar to the chain shown in Fig. 4, are provided with the control elements necessary for their operation. Referring now to Fig. 5*a* the necessary pulses required for the operation of the pulse distributor are generated by a multivibrator 13. Connected to the output of multivibrator 13 are two frequency dividers 14 and 15 as well as two coincidence pulse mixing circuits 17A and 17B. Multivibrator 13 generates rectangular impulses of a given frequency diagrammatically shown in Fig. 6*c*. Circuit 14 divides the repetition rate of the pulses shown in Fig. 6*c* by two (Fig. 6*d*). These divided pulses are then applied to the input of the second frequency divider 15, where pulses of a repetition rate one-quarter that generated by the free-running multivibrator 13 are produced at terminals 15A and 15B 180 degrees out of phase with each other as shown in Figs. 6*a* and 6*b*. These quarter frequency impulses are, respectively, fed into two pulse distribution lines 16A and 16B. These impulses are used as conditioning impulses for operation of the trigger chains.

It will be appreciated that since the pulses applied to lines 16A and 16B are each in phase opposition, and since they are used as conditioning impulses, respectively, for the A chain and the B chain of triggers, it will not be possible for triggers in both chains to operate simultaneously. In other words, the triggers of chains A and B always operate in an alternate fashion.

The logical AND circuit 17A is provided with 3 inputs connected, respectively, to the output of multivibrator 13, frequency divider 14, and output 15A of frequency divider 15. In accordance with the operation of AND circuits it will be appreciated that pulses will appear at the output of 17A only if there is coincidence between the three pulses produced by multivibrator 13 and frequency divider 14 and 15. Such a condition is shown in Figs. 6*e* and 6*e'*. In an identical manner logical AND circuit 17B operates to produce a series of pulses timed in relation to the pulses produced by AND circuit 17A, as shown in Figs. 6*f* and 6*f'*. The pulses produced by logical AND circuit 17A are applied to the operate and reset lines 12A and 12'A, and serve to operate and reset the triggers in chain A. The pulses produced by logical AND circuit 17B are applied to the operate and reset lines 12B and 12'B and serve to operate the triggers in chain B.

*Operation of the chains*

As has been explained above in connection with Fig. 4, one trigger in each chain will be in its operated, or ON, stable state, i.e. the right hand tube is conducting. All other triggers in each chain are in their OFF stable state. Refer now to trigger $n+1$ in chain A (Fig. 5*b*) which is assumed to be in the ON state. Terminal 4' of this trigger receives a conditioning voltage from the plate circuit of its non-operated tube terminal 11. Terminal 11 is also connected to one input of AND circuit 18A which is turned ON by the arrival at its second input of the next produced pulse from frequency divider 15 on line 16A. This pulse thus passes through AND circuit 18A and OR circuit 19*n* and is applied to both terminals 4 of A chain trigger *n* and B chain trigger *n*, conditioning these triggers for operation simultaneously. During the conditioned interval an operating pulse is produced by AND circuit 17A. This pulse is fed through AND circuit 38 (the other terminal of which is positive as will be explained below), OR circuit 39 to line 12A, and in parallel through OR circuit 44 to line 12'A. Hence, this operating pulse is simultaneously applied to terminal 5' of trigger $n+1$ of chain A from line 12'A and to terminal 5 of trigger *n* of chain A from line 12A. Trigger $n+1$ of chain A is turned OFF and trigger *n* of chain A is turned ON simultaneously.

Similarly it will be appreciated that a pulse applied to line 16B will traverse an AND circuit 18B (not shown) and act to condition trigger *p*, Fig. 5*c*, in chain B for operation at such time that the next pulse is produced by AND circuit 17B and transmitted through AND circuits 42 and 57, lines 12B and 12'B to terminal 5 of trigger *p*. Because of the 180 degree phase difference in signals produced by frequency divider 15 and applied to lines 16A and 16B it will be understood that it is impossible to operate triggers in both chains A and B simultaneously and that the individual triggers in the chains will operate in an alternate fashion, as follows: $n+1$ and *n* in chain A; $p+1$ and *p* in chain B; *n* and $n-1$ in chain A; *p* and $p-1$ in chain B, etc. Each trigger in both of the A and B chains is provided with an output terminal 60 which is connected to trigger terminal 11' for the purpose of providing output signals to associated apparatus (not shown). While only three triggers have been shown in detail in each chain, it will be understood that the invention contemplates that any number of triggers may be used.

This invention contemplates a novel settable programming means for directing the operation of the triggers in chains according to any prearranged routine.

For the purpose of programming the operation of chains A and B, a third series of triggers, *m*, $m-1$, $m-2$, etc. is provided. These triggers are sequentially connected in a chain C, similar to that previously described in connection with Fig. 4.

Each trigger in chain C is associated with a series of five plughubs 20A and B, 21A and B and 45'. Plughubs 20 emit start pulses for enabling chains A or B. Plughubs 21 emit stop pulses for disabling chains A or B. Each plughub 20 and 21 is provided with an AND circuit under the control of the associated C chain trigger and other circuits, now to be described, for sequencing the operation of the A and B chains of triggers. An illustrative example of such sequencing is where chain B starts operating following an enabling of chain A. Chain A may be stopped by a disabling pulse without affecting the continued operation of chain B. However, the disabling of chain B will also render chain A disabled and in this instance a start signal is generated to advance the control or program chain C for reinitiating operation of chains A and/or B in a new sequence.

Trigger 24 (Fig. 5*a*) operates to generate program start signals which are produced at terminal 11 and are transmitted through OR circuit 56 to line 25. Each trigger stage in the A and B chains is provided with a logical AND circuit 27, one of the input terminals of each being connected to line 25. The other input terminal and each AND circuit 27 is connected to a plughub 26, each stage of both chains being provided with a plughub 26, to which will be directed all start or stop control pulses emitted by plughubs 20 or 21.

In describing the operation of the chains according to the above example, assume that both chain A and chain B are provided with more than three triggers each. It will be assumed further that chain A is to be started at stage *n*, stopped at stage *q*, and that chain B is to be started at stage *p* and stopped at stage *r*. As chain B starts immediately after chain A, and if $(n-q)$ is equal to or less than $(p-r)$, then A will stop before B. Also, as chain B controls the disabling of chain A, then if $(n-q)$ is greater than $(p-r)$ the stopping of chain B at stage *r* will determine simultaneous stopping of chain A.

The control of the chains is accomplished by selectively placed plugwire connections between the plughubs controlled by the program chain C and the individual stage plughubs 26 associated with the A and B chains. Of the series of plughubs controlled by the *m* stage of chain C, hub 20A is connected to hub 26*n*, plughub 21A to plughub 26 $(q-1)$, plughub 20B to 26*p* (not shown), and plughub 21B to plughub 26 $(r-1)$. As long as trigger *m* is maintained in its operated ON stable state, a positive voltage derived from terminal 11 will be impressed on one each of the inputs to the AND circuits 22A, 23A, 22B and 23B. Another of the input terminals of each of AND circuits 22A and 23A is connected to line 16A. The third input to AND circuit 22A is connected to terminal 11 of the start trigger 24. Hence at such time as the start trigger is turned ON by a pulse produced by AND circuit 17B the next pulse appearing on line 16A will be transmitted through AND circuit 22A, through the plugwire connecting plughub 20A to plughub 26*n*. This pulse is shown in the timing chart, Fig. 6*i*, and is transmitted through AND circuit 27*n*, OR circuit 19*n* to terminals 4 of the *n* stage triggers in the A and B chains conditioning them for operation. Trigger *n* in the A chain will be turned ON on reception on its terminal 5 of the next produced start pulse transmitted over line 12A.

In a like manner the pulse transmitted by AND circuit 22B, over a plugwire from hub 20B to hub 26*p*, conditions triggers *p* of both A and B chains for operation. However, only B chain trigger *p* will be turned ON since this conditioning pulse is produced only during such times as start pulses are produced on line 12B.

Figures 6, 7:
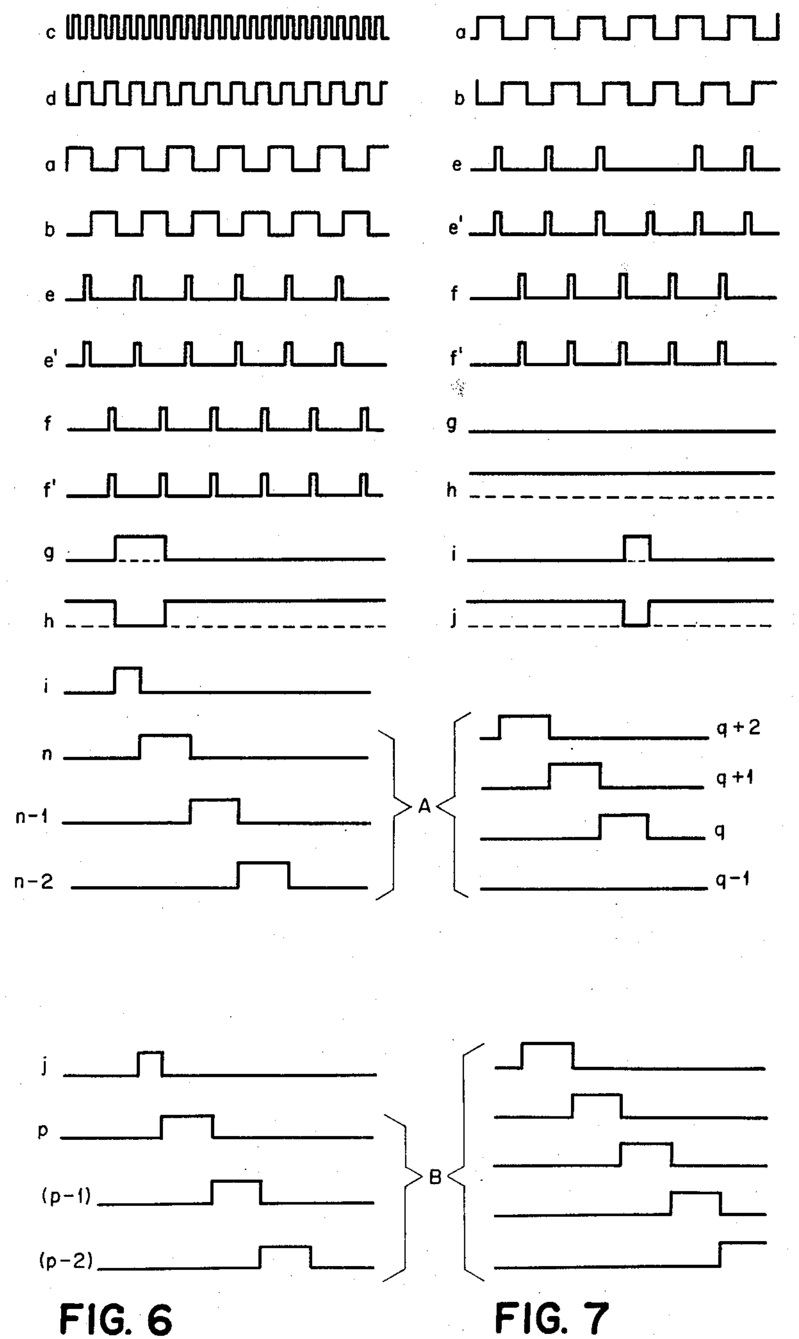
Figure 8:
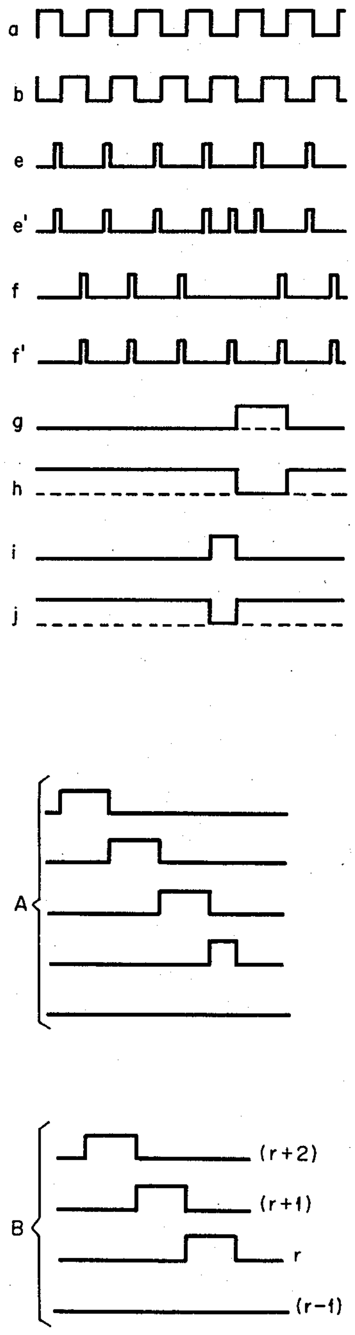
Figure 9:
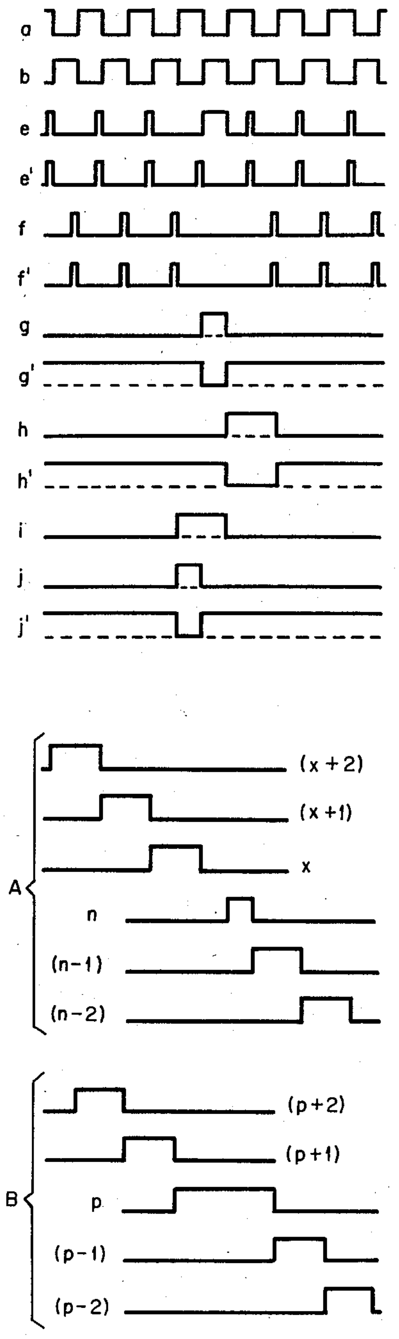

Following the operation of triggers *n* and *p* succeeding triggers in each of the A and B chains will be operated as shown diagrammatically in Fig. 6*n*, 6$(n-1)$, 6$(n-2)$, etc., for the A chain, and Fig. 6*p*, 6$(p-1)$, 6$(p-2)$, etc., for the B chain.

Stopping the A chain is accomplished when pulses applied through line 16A pass through AND circuit 23A (the other three inputs of 23A being at a relatively positive potential), plughub 21A, plugwire, plughub 26$(q+1)$ to AND circuit 27$(q+1)$. Start signals are impressed on the other input of AND circuit 27$(q+1)$ from line 25; however, these are not timed to occur simultaneously with the pulses gated through AND circuit 23A. Hence trigger $q+1$ in the A chain is not conditioned for operation at this time. The pulses gated by AND circuit 23A are also applied to AND circuit $29(q+1)$ over a wire 30. A relatively positive potential (Fig. 7*h*) is applied over wire 31 to another input of AND circuit $29(q-1)$. The third input is connected to the output of OR circuit $19(q+1)$. At such time that trigger order $q+1$ is turned ON its terminal 11 conditions AND circuit 18A so that this AND circuit gates the next operating pulse from line 16A through OR circuit 19*q*, AND circuit 29*q*, to condition trigger order *q* and which will trigger OR circuit 32, (OR circuit 32 has as many inputs as there are triggers in the A and B chains). The pulse is transmitted over line 33 to one of the inputs of AND circuit 34 (Fig. 5*a*). Because the pulse output from 32 is derived from a line 16A pulse and because the second input of AND circuit 34 is connected to line 16A (the third input is relatively positive), there is a coincidence and 34 gates a pulse through OR circuit 35, inverter 36 which operates to lower the normal potential on one of the two inputs to AND circuit 38, thereby preventing transmission of advance pulses produced by AND circuit 17A over advance line 12A. AND circuit 37 is also connected to the output of OR circuit 32. However, there will be no output from this AND circuit, inasmuch as its other input in connected to line 16B transmitting pulses 180 degrees out of phase. Inasmuch as the advance pulses are prevented from being transmitted through AND circuit 38 to line 12A, trigger stage *q* will not receive an operate pulse on its terminal 5. The interrupted pulse will be transmitted through OR circuit 44 over line 12′A, and will act to turn OFF trigger stage $q+1$ to thereby remove the conditioning voltage present on terminal 4 of trigger *q* and stop the A chain.

The procedure of stopping the A chain does not influence the operation of the B chain. However, whenever the B chain is stopped the A chain is also stopped.

Similar to the description above, in connection with the A chain, a stop pulse is produced by AND circuit 23B and emitted from plughub 21B over a plugwire to plughub $26(r+1)$. Since this pulse is not synchronous with a start pulse (Fig. 8*g*) over line 25 AND circuit $27(r+1)$ will not be gated and the pulse will be transmitted through AND circuit $29(r+1)$, OR circuit 32, line 33 to AND circuits 34 and 37. There will be no output from AND circuit 34 since one of its inputs receives a negative signal at this time (Figs. 8*a*, 8*b*). However, AND circuit 37 will transmit this stop pulse (Fig. 8*i*) over line 40 and through inverter 41. The reversal of phase of the pulse at the output of the inverter operates to prevent transmission of B chain operating pulses through AND circuit 42. Thus trigger stage *r* will not receive an advance pulse over line 12B on its terminal 5 and trigger stage $r+1$ will be turned off by virtue of having received a pulse over line 12′B to remove conditioning potential from terminal 4 of trigger *r* to thereby stop the chain.

The transmission of the stop pulse through AND circuit 37 is fed through AND circuit 43 (the other input of which is relatively positive), through OR circuit 44 to line 12′A of the A chain to thereby impress a stop pulse on terminal 5′ of whichever trigger stage in the A chain is ON to turn said trigger OFF and to stop the A chain.

Also the transmission of the stop pulse through AND circuit 37 is applied to terminal 4 of trigger 24, conditioning the same for operation at such time as AND circuit 17B produces the next timing pulse turning trigger 24 ON. As trigger 24 turns ON the potential at terminal 11 rises and this relatively positive potential is applied to one of the inputs associated with AND circuits 22A, 23A, 22B, 23B associated with trigger stage $m-1$ of chain C.

Line 40 also supplies the stop pulse to each terminal 5—5′ of all the triggers in chain C to thereby turn trigger

*m* OFF and to turn trigger $m-1$ ON for initiating a new program.

It will be appreciated that by use of selective plugging chain A actions are dependent upon chain B. In a contemplated use in a computer chain B is operated through complete cycles of operation while chain A may be started and stopped from various different triggers for each advance of a trigger stage in chain C.

The invention also contemplates means adapted to cause chain A to skip selectively determined trigger stages under the control of chain B.

In accomplishing this mode of operation each trigger stage in the B chain is provided with an AND circuit 49 adapted to produce on a plughub terminal 46 a skip pulse for causing chain A to skip over a predetermined number of trigger stages without operating them.

The skip pulse is produced by the interaction of the selected B chain trigger and a skip control circuit comprising plughubs 45, 45′, triggers 47, 48, and AND circuits 50 and 55.

As an example of a skip operation, assume that as chain B turns on trigger stage *p* it is desired that chain A skip from whatever stage it has operated to stage *n*, and that the advance continue from stage *n*. Plughubs 46*p* and 26*n* are connected together by a plugwire, and a second plugwire is used to connect plughub 45 with a selected one of the several plughubs 45′ (Fig. 5*a*) so that the desired skip will be effective only during a selected stop of the program chain C. Connection of these two hubs places positive potential on the grid of the inverter connected between hub 45 and AND circuit 34 and conditions one of the two inputs to AND circuit 50. The other input to AND circuit 50 is also raised by virtue of being connected to terminal 11′ of trigger 48 now in its OFF stable state. Hence AND circuit 50 acts as a gate to raise the potential on line 52 and to thus condition one input of AND circuit 49*p*. The other input to this AND circuit is connected to terminal 11 of B chain trigger *p*, and goes positive when that trigger is turned ON. This action gates a pulse (Figs. 9*a*–9*b*) through AND circuit 49, plughub 46*p*, the plugwire, plughub 26*n*, to AND circuit 27*n* and over wire 30*n* to OR circuit 53. There are as many inputs to OR circuit 53 as there are plughubs 26. The pulse is transmitted through OR circuit 53, over wire 54 to AND circuit 55 having three other inputs (Fig. 5*a*). The input from AND circuit 50 is positive as is the input from terminal 11′ of the program start trigger 24. The fourth input receives pulses from line 16A (Fig. 9*a*), which also serve to condition A chain triggers. The pulse gated by AND circuit 55 (Fig. 9*i*) has a twofold function; one is to stop the A chain at the selected trigger, and the second is to turn skip trigger 47 ON. The A chain is stopped when this pulse removes the negative bias from inverter 36 thereby preventing an advance pulse from passing through AND circuit 38. The pulse is also applied to terminal 4 of skip trigger 47 conditioning the same for being operated by an advance pulse on its terminal 5.

The operation of the start trigger produces a pulse (Fig. 9*g*) which passes through OR circuit 56, line 25 (Fig. 5*b*), to AND circuit 27*n* for conditioning the *n* trigger in the A chain. This trigger is then operated ON by this same pulse passing through OR circuit 39 and line 12A. The pulse produced by the start trigger also conditions lock trigger 48 for operation one-half cycle later by a pulse (Fig. 9*f*) produced by AND circuit 17B. When trigger 48 is turned ON positive potential is removed from one input of AND circuit 50, over line 51, thereby also gating OFF AND circuits 55 and 49, the first of which acts to restore inverter 36 and AND circuit 38 to their normal states. The lock trigger 48 is turned OFF with the next B chain advance pulse. It will be appreciated, of course, that the B chain continued to operate by virtue of receiving a conditioning voltage on terminal 4 of trigger $(p-1)$.

While there have been shown and described and pointed out the fundamental features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An impulse producing system, comprising a plurality of chains of cascade connected dual stability triggers, a source of phase displaced impulses for operating each chain of triggers, means interconnecting a trigger in one chain with a trigger in another chain, a source of control impulses, and means responsive to a simultaneous occurrence of a control impulse and a phase displaced impulse for rendering said chains of triggers alternately responsive to successively occurring ones of said phase displaced impulses.

2. An impulse producing system having a plurality of output terminals comprising, in combination, a source of oscillations, means responsive to said source for generating a pair of trains of operating impulses displaced in phase with respect to each other, a pair of chains of dual stability cascade connected triggers, each chain being responsive to one train of said pair of trains of phase displaced impulses for generating impulses alternately in seriatim at pairs of output terminals, normally enabled gating means for transmitting operating impulses to one of said chains, means interconnecting successive triggers in each chain for normally preventing successive operation of triggers unless conditioned, means responsive to said source of oscillations and to a predetermined one of the stable states of a prior operated trigger in either of said chains for rendering asid trigger interconnecting means responsive, and means responsive to the operation of a predetermined trigger in the other of said chains and to said means intreconnecting a trigger pair in the said one chain for disabling said normally enabled gating means whereby the successive operation of triggers in the said one chain is interrupted.

3. The invention as claimed in claim 2, further comprising means for enabling the continued operation of successive triggers in the other of said chains.

4. The invention as claimed in claim 3, further comprising selectable means responsive to the operation of a second predetermined trigger in the other of said chains for enabling and reinitiating operation of a different trigger in said one chain.

References Cited in the file of this patent

UNITED STATES PATENTS

| | | |
|---|---|---|
| 2,486,491 | Meacham | Nov. 1, 1949 |
| 2,602,140 | Fink | July 1, 1952 |
| 2,816,223 | Nelson | Dec. 10, 1957 |
| 2,848,166 | Wagner | Aug. 19, 1958 |